(12) United States Patent
Grangeon et al.

(10) Patent No.: US 7,192,522 B2
(45) Date of Patent: Mar. 20, 2007

(54) FILTERING DEVICE INCORPORATING A CIRCULATION LOOP

(75) Inventors: André Grangeon, Valreas (FR); Philippe Lescoche, Faucon (FR)

(73) Assignee: Societe Industrielle de la Vallee de l'Aigues S.I.V.A., Nyons (FR)

( * ) Notice: Subject to any disclaimer, the term of this patent is extended or adjusted under 35 U.S.C. 154(b) by 0 days.

(21) Appl. No.: 10/296,949

(22) PCT Filed: Jun. 14, 2001

(86) PCT No.: PCT/FR01/01864

§ 371 (c)(1),
(2), (4) Date: Apr. 7, 2003

(87) PCT Pub. No.: WO01/96003

PCT Pub. Date: Dec. 20, 2001

(65) Prior Publication Data

US 2004/0007517 A1    Jan. 15, 2004

(30) Foreign Application Priority Data

Jun. 14, 2000  (FR)  .................................... 00 07551

(51) Int. Cl.
*B01D 29/52* (2006.01)
*B01D 29/56* (2006.01)
*B01D 29/00* (2006.01)

(52) U.S. Cl. ............................... 210/416.1; 210/323.2; 210/321.79; 210/321.88; 210/433.1

(58) Field of Classification Search ............. 210/195.2, 210/416.1, 321.79, 321.88, 323.2, 433.1, 210/321.66, 258, 321.6, 321.84, 416.3, 435, 210/321.76, 321.78, 321.8, 321.85, 321.87

See application file for complete search history.

(56) References Cited

U.S. PATENT DOCUMENTS

| 3,369,667 A | 2/1968 | Clark et al. |
| 3,708,069 A * | 1/1973 | Clark ........................ 210/181 |
| 3,893,920 A | 7/1975 | Hubbard et al. |
| 4,239,624 A | 12/1980 | van Zon |
| 4,498,990 A | 2/1985 | Shaldon et al. |
| 4,702,842 A | 10/1987 | Lapierre |
| 5,096,583 A | 3/1992 | Roux et al. |

FOREIGN PATENT DOCUMENTS

| DE | 3323725 | 12/1983 |
| EP | 217568 | 4/1987 |
| JP | 10-109022 | 4/1998 |
| WO | 81/02835 | 10/1981 |
| WO | 98/36824 | 8/1998 |
| WO | 98/57732 | 12/1998 |

* cited by examiner

Primary Examiner—Krishnan S. Menon
(74) Attorney, Agent, or Firm—Dennison, Schultz & MacDonald

(57) ABSTRACT

The invention concerns a device for tangential filtering of a fluid to be treated, comprising in a housing (2):
a separating part (15) mounted in the first communicating chamber (11), in sealed contact with the neighboring positioning plate (4), to divide said chamber into first (V1) and second (V2) volumes externally and internally delimited by the separating part and communicating with said two-way circuit, comprising a communication passage (24) between the first volume (V1) and the second volume (V2), internally equipped with a turbine (23) of a circulating pump, provided with a driving shaft (25) extending outside the first chamber (11) to be connected to a driving motor (26),
and a closure housing (13) mounted sealed on a neighboring positioning plate (4), delimiting the first communicating chamber (11) and sealingly traversed by the turbine (23) driving shaft (25).

8 Claims, 3 Drawing Sheets

FILTERING DEVICE INCORPORATING A CIRCULATION LOOP

The invention described here concerns the technical field of molecular or particulate separation using separating elements generally called membranes, adapted to separate molecules or particles contained in a fluid medium to be treated.

The invention has a particularly advantageous application in the field of filtering for fluid media to be treated in general, and in particular for nanofiltering, ultrafiltering, microfiltering, etc.

In the present state of the technology, there are many known variants for creating an installation for filtering fluids. Filtering installations comprise, for example, at least one and generally two filtering devices each comprising, in an envelope, a series of tubular filtering elements extending parallel to each other, and sealingly mounted at both ends on a positioning. Each filtering element comprises at least one circulation channel for the fluid to be treated. The filtering elements provide tangential filtering of the fluid, in view of egress of the filtrate at the peripheral surface of the filtering elements, so that it may be recovered in a collection volume located between the positioning plates and the envelope.

The two filtering devices are mounted in series inside a circulation loop in which a circulating pump is connected to the filtering devices via an inlet tube carrying the fluid to be treated and a return tube which recovers the fluid after it has circulated inside the filtering elements, referred to as the retentate. The circulating pump ensures circulation of the fluid to be treated at high speed inside the filtering elements, which tends to generate a shear stress which re-disperses the materials deposited on the surface of the channels of the membrane.

It must be taken into consideration that this antifouling principle takes place inside a circulation loop which consists of two filtering devices mounted in series and the inlet and return tubes for the fluid to be treated. This installation is satisfactory as far as processing the fluid is concerned. However, this type of installation has a relatively high fabrication cost due to the need to construct a circulation loop requiring several tubes and connections. In addition, such installations are relatively large in size.

To attempt to correct these disadvantages, Patent Application EP 0 217 568 proposes a filtering device comprising, within a housing, a series of filtering elements of tubular shape placed parallel to each other and sealingly penetrating a positioning late at each of their ends. The filtering elements each have at least one circulation channel for the fluid to be treated and provide filtering of said fluid with the goal of egress of the filtrate at the peripheral surface of the filtering elements, after which it is recovered in a collection volume located between the positioning plates and the housing. One extremity of each filtering element opens into a communicating chamber which provides communication between an outgoing circuit and a return circuit for the fluid to be treated circulating in two distinct series of filtering elements. This integrated circulation loop is connected externally to a pump for circulating the fluid to be treated. Such a device therefore requires connection to an external circulating pump, which increases its fabrication cost and its size.

The present invention therefore attempts to remedy the disadvantages of the earlier technique by proposing a device for tangential filtering of a fluid, designed to have a reduced fabrication cost and a limited size while maintaining a high filtering output.

To attain that objective, the invention proposes a device for tangential filtering of a fluid to be separated into a filtrate and a retentate, said device comprising, inside a housing:
- at least one inlet for the fluid to be treated,
- at least one outlet for the retentate,
- a series of filtering elements of tubular shape extending parallel to each other and each end of which sealingly penetrates a positioning plate, each filtering element comprising at least one circulation channel for the fluid to be treated and providing filtering of said fluid with the goal of egress of the filtrate at the peripheral surface of the filtering elements, after which it is recovered in a collection volume located between the positioning plates and the housing,
- at least one outlet for the filtrate communicating with the filtrate collection volume,
- and a first communicating chamber into which opens one end of each filtering element and which provides the communication between the outgoing circuit and the return circuit of at least one circulation loop for the fluid to be treated.

Depending on the invention, the device comprises:
a separating part:
 mounted in the first communicating chamber, sealed against the neighboring positioning plate, to divide said chamber into a first and second volume, delimited externally and internally by the separating part and communicating with the two-way fluid circuit:
 comprising a communication passage between the first volume and the second volume,
 equipped internally with a turbine of a circulating pump, fitted with a driving shaft extending outside the first chamber in order to connect to a driving motor,
 and a closure housing, sealed against a neighboring positioning plate, delimiting the first communicating chamber and sealingly traversed by the driving shaft of the turbine.

Various other characteristics will be evident from the description given below with reference to the annexed drawings, which show examples of the types of fabrication and operation of the invention being described.

Figure 1:
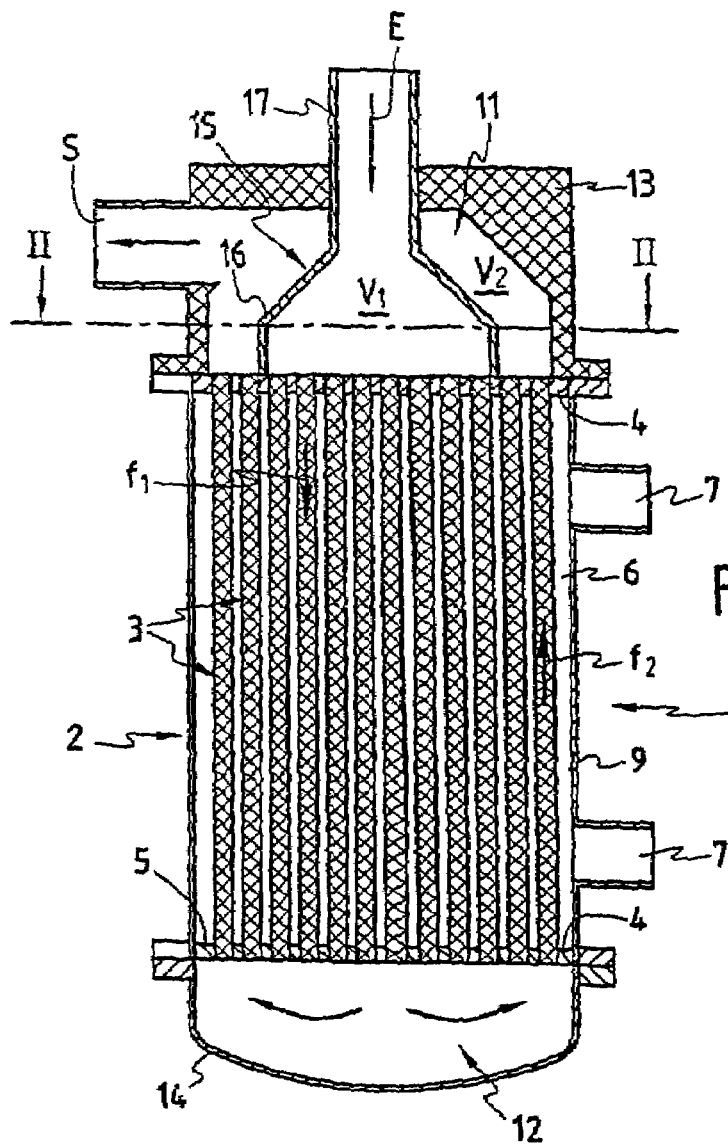
FIG. 1 is a longitudinal section view of an example of realization of a device to which the invention applies.
Figure 2:
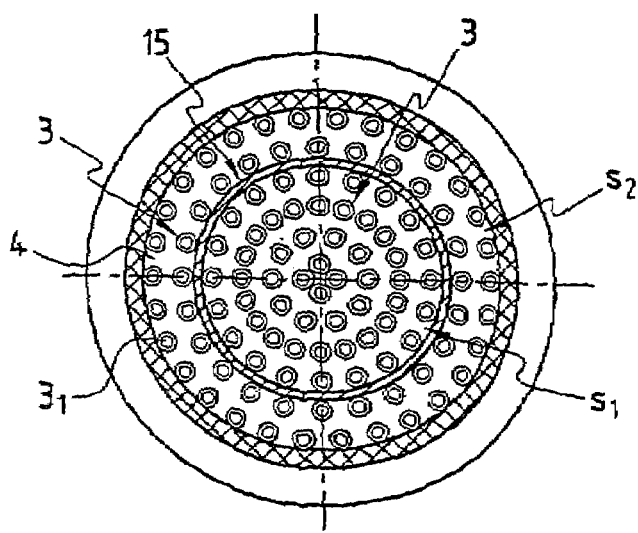
FIG. 2 is a transverse section view more or less along lines II—II of FIG. 1.

FIGS. 1 and 2 show a device or module 1 providing tangential filtering for a fluid to be treated which can be of any type. Device 1 comprises, within a housing 2, a series of filtering elements 3 of tubular shape extending parallel to each other. The external section of each filtering element 3 is, for example, hexagonal or circular. Each filtering element 3 comprises at least one channel $3_1$ parallel to the longitudinal axis of the filtering element. The surface of channels $3_1$ is covered by at least one separating layer, not represented, designed to be in contact with the fluid medium circulating inside the channels. The nature of the separating layer or layers is chosen as a function of the power of separation or filtering to be attained.

Filtering elements 3 are mounted at each of their ends on a positioning plate 4 mounted inside the housing 2. In the classic configuration, each positioning plate 4 comprises a hole 5 for the passage of the end of a tubular filtering element 3. Each hole 5 is fitted with a seal allowing fluid-tight mounting of the filtering elements 3 on the positioning plates 4. The positioning plates 4 form, between themselves and housing 2, a collection volume 6 for the filtrate exiting the peripheral surface of the filtering elements 3. This collection volume 6 communicates via at least one, and in the example shown, two outlets 7 for the filtrate. In the example shown, each filtrate outlet 7 consists of a section of tubing connected to a collar 9 in part comprising housing 2, and at each end of which are mounted the positioning plates 4. Thus collar 9 delimits, with the positioning plates 4, collection volume 6.

Filtering device 1 also comprises a first communicating chamber 11 built into housing 2 and into which open, beyond one positioning plate 4, one end of the filtering elements 3, while the other ends of the filtering elements 3 open beyond the other filtering plate 4, into a second communicating chamber 12. As shown more precisely in FIG. 1, the first chamber 11 is delimited inside a closure housing 13 fitted to collar 9, while the second communicating chamber 12 is delimited between the neighboring positioning plate 4 and a sealing cap 14 mounted on collar 9 and/or positioning plate 4. Thus housing 2 consists of collar 9, closure housing 13 and sealing cap 14.

In the example shown, Device 1 comprises a separating part 15 mounted in the first communicating chamber 11 in such a way as to divide said first chamber into a first volume $V_1$ for feeding fluid to be treated to a first series $s_1$ of filtering elements 3, in an initial direction represented by arrow $f_1$, and a second volume $V_2$ for recovery of the fluid having circulated in a second direction $f_2$, opposite to direction $f_1$, and in a second series $s_2$ of filtering elements 3. Thus, for example, separating part 15 is sealed against the neighboring positioning plate 4, in such a way as to divide the volume of the first chamber 11 into a first volume $V_1$ and a second volume $V_2$, located, respectively, inside and outside the separating part in the example shown. It must be understood that the filtering elements 3 belonging to the first series are different from the filtering elements 3 of the second series $s_2$. Following the preferred type of realization, separating part 15 is mounted in such a way that the series $s_1$, $s_2$ of filtering elements 3 comprise a more or less equal number of filtering elements 3. In the example shown, the number of filtering elements 3 is 108, arranged in six rings. As can be seen more precisely in FIG. 2, each series $s_1$, $S_2$ comprises 54 filtering elements 3. In this example, the filtering elements 3 belonging to the first series $s_1$ are located inside the virtual envelope formed by the extension of separating part 15, while the filtering elements 3 belonging to the second series $s_2$ are located outside this virtual envelope.

In the example shown in FIG. 1, separating part 15 is in the shape of a funnel formed by a conical collar 16 for mounting on the neighboring positioning plate 4. The mounting collar 16 is prolonged by a tube 17 which sealingly penetrates closure housing 13. Tube 17 of separating part 15 is connected in the example shown to the circulating pump, not shown, providing feeding of the fluid to be treated into the first volume $V_1$ in such a way as to ensure circulation of the fluid inside the filtering elements 3 of the first series $s_1$ in direction $f_1$. Thus tube 17 serves as an inlet E for the fluid to be treated. The second volume $V_2$ of the first communicating chamber 11 communicates with an outlet S for the retentate to be recirculated to the intake of the circulating pump.

The operation of filtering device 1 described above results directly from the preceding description.

The fluid to be treated exiting the circulating pump is carried to the first volume $V_1$, that is, inside separating part 15. The fluid to be treated enters channels $3_1$ of the filtering elements 3 of the first series $s_1$. The fluid to be treated thus circulates in the first direction $f_1$ in tubular elements 3 of the first series and then enters the second communicating chamber 12. It should be noted that a part of the fluid to be treated exits at the peripheral surface of the filtering elements 3 in the form of a filtrate which is recovered by collection volume 6. The fluid to be treated recovered in the second communicating chamber 12 will then circulate in the filtering elements 3 of the second series $s_2$, given the fact that the second volume $V_2$ communicates with the intake of the circulating pump. The fluid to be treated thus circulates in the filtering elements 3 of the second series $s_2$, in a second direction $f_2$, opposite to the first direction $f_1$. During this return journey, the filtrate exiting the peripheral surface of the filtering elements 3 of the second series $s_2$ is recovered in collection volume 6.

Thus such a Device 1 comprises an integrated circulation loop for the fluid to be treated, which makes it possible to reduce the necessary connecting tubes compared to an installation using two filtering modules mounted in series. The fluid to be treated circulates in a path or circuit considered as being outgoing in the first direction $f_1$ and in a return or incoming circuit in the second direction $f_2$. In the example under consideration, the filtering elements 3 located inside the virtual envelope which prolongs separating part 15 provide circulation of the fluid in the first direction, while the filtering elements mounted outside the virtual envelope prolonging separating part 15 provide circulation in the second direction $f_2$. Of course, it is possible to reverse the circulation of the fluid in the first and second series of filtering elements by connecting the discharge outlet of the pump directly to outlet S, while tube 17 of separating part 15 would be connected to the intake outlet of the circulating pump.

It should be noted that the separation of the filtering elements into two series $s_1$, $s_2$ comprising an identical number of elements 3 results in the same circulation volume in each filtering element 3. The circulation rate, which is the preponderant parameter in tangential antifouling, thus has the same value in each filtering element 3.

Figure 3:
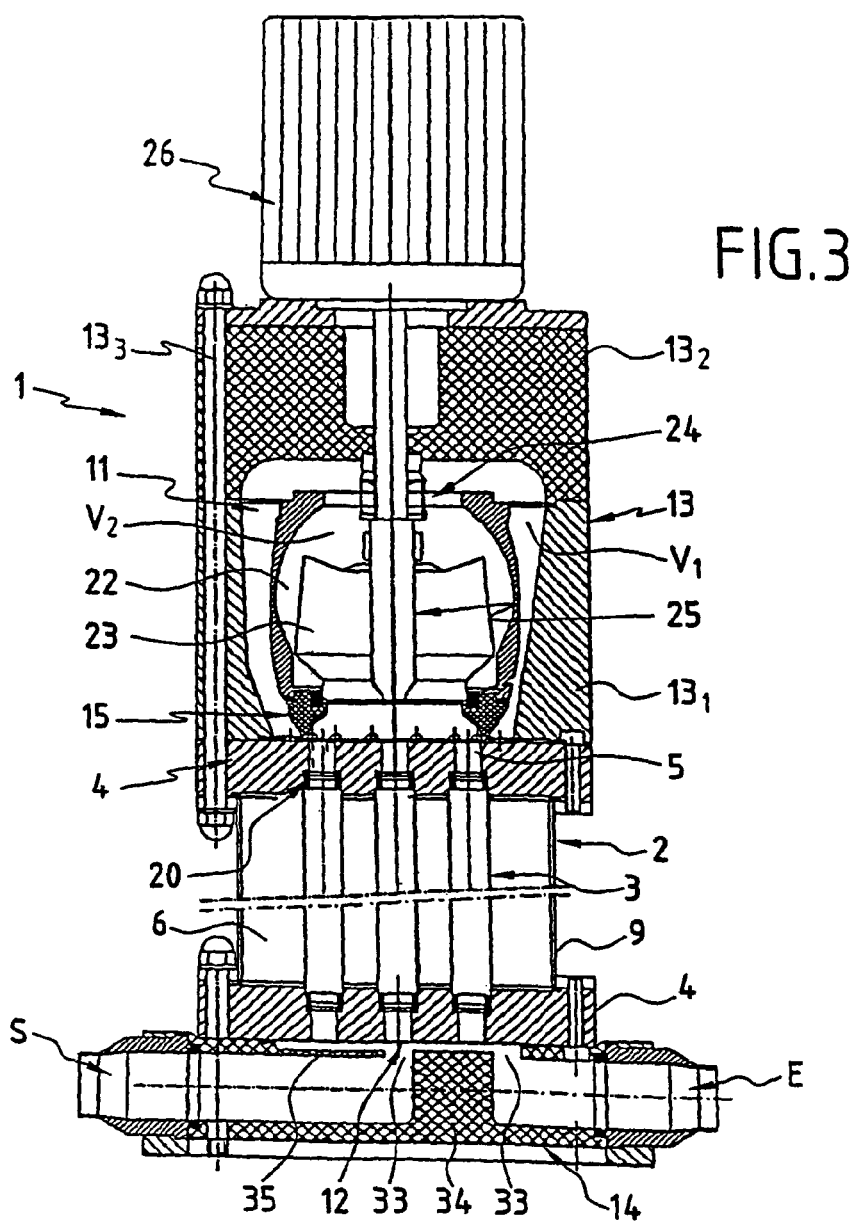
FIG. 3 is a partial section-elevation view of a first example of realization of a device in conformity with the invention.
Figure 4:
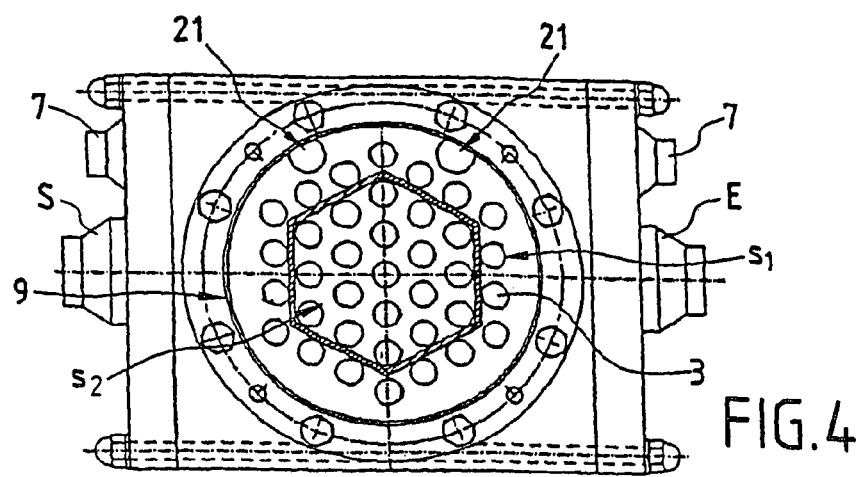
FIG. 4 is a view from below of the device shown in FIG. 3.

In conformity with the invention, filtering device 1, whose principle is described above, is adapted to include a circulating pump. FIGS. 3 and 4 show a first variant of a filtering device 1 in conformity with the invention, preferably placed vertically, as shown in the drawings. For the sake of simplification, the elements identical to those described in connection with FIGS. 1 and 2 are referred to by the same numbers. In this example, Device 1 also comprises, within a housing 2, a series of filtering elements 3 mounted sealingly at each end by means of a seal 20 on a positioning plate 4. The filtrate collection volume 6 is delimited by collar 9, sealed against positioning plates 4. In this example, collection volume 6 is connected to two filtrate outlets 7 in the sealing cap, 14. To this end, sealing cap 14 has, for example, two orifices 21 communicating with, on the one hand, the filtrate outlets via a channel not represented in the drawing and built into sealing cap 14 and, on the other hand, with orifices not represented in the drawing in the neighboring positioning plate 4 and opening into collection volume 6. In this way, realization of collar 9, which does not comprise the outlets 7, is simplified.

In this example, separating part 15 internally delimits housing 22 for a turbine 23 of a circulating pump. In this example, separating part 15 takes the form of a plug sealed against the neighboring positioning plate 4. Separating part 15 internally delimits the second volume $V_2$ and externally, in combination with closure housing 13, the first volume $V_1$. Closure housing 13 can be fabricated in two parts $13_1$, $13_2$ joined to each other and positioning plate 4 via fasteners $13_3$. A communication passage 24 built into separating part 15 ensures passage of the fluid to be treated between volumes $V_1$, $V_2$. Turbine 23 comprises a driving shaft 25 connected to a driving motor 26 in rotation mounted to part $13_2$ of closure housing 13. Preferably, driving shaft 25 is mounted in the alignment of the axis of collar 9 in which filtering elements 3 are regularly distributed along the axis of the collar. Closure housing 13 of course comprises a sealed passage for the driving shaft, 25.

As explained in the example shown in FIGS. 1 and 2, the first volume $V_1$ feeds the fluid to be treated, as will be explained below, to a first series $s_1$ of filtering elements 3 in a first direction, while the second volume $V_2$ provides recovery of the fluid which has circulated in a second direction opposite to the first direction, in a second series $s_2$ of filtering elements different from the filtering elements 3 of the first series $s_1$. It should be noted that in this example, the filtering elements 3 belonging to the first series $s_1$, are located outside the virtual envelope which prolongs separating part 15, while the filtering elements 3 belonging to the second series $s_2$ are located inside the virtual envelope prolonging separating part 15. The number of filtering elements 3 of the first and second series $s_1$, $s_2$, for example, is respectively 18 and 19.

Another advantageous characteristic is that the second communicating chamber 12 is built into sealing cap 14, which is fitted with an inlet E for the fluid to be treated, an outlet S for evacuation of the retentate and, as indicated above, with the filtrate outlets 7. The second communicating chamber 12 is delimited by the neighboring positioning plate 4 and feeds fluid to be treated to filtering elements 3 of the second series $s_2$ and then recovers the fluid once it has circulated in filtering elements 3 of the first series $s_1$. This second communicating chamber 12 is connected to fluid inlet E and outlet S for evacuation of the retentate via circulation passage 33.

In the example shown, sealing cap 14 comprises a solid section 34 which separates inlet E from outlet S and in part delimits chamber 12, which is also delimited by an extension 35. In a simplified fabrication version, solid section 34 can be eliminated, and also possibly extension 35. In this form, communicating chamber 12 occupies the greater part of the internal volume of sealing cap 14.

The operation of Device 1 described in FIGS. 3 and 4 results directly from the preceding description. The fluid to be treated arrives via inlet E and is drawn into filtering elements 3 of the second series $s_2$ by the effect of the operation of turbine 23, having previously passed through the second communicating chamber 12. The fluid thus travels up filtering elements 3 of the second series $s_2$, which thus form the outgoing circuit of the circulation loop, to the second volume $V_2$ of the first chamber 11. After having transited the volume of turbine 23, the fluid to be treated passes through communication passage 24 to enter the first volume $V_1$ in such a way as to be directed through filtering elements 3 of the first series $s_1$, which form the return circuit of the circulation loop. The fluid having circulated through the filtering elements 3 of the first series $s_1$ is recovered in the second communicating chamber 12 and then distributed, on the one hand, to the filtering elements 3 of the second series $s_2$ and to retentate evacuation outlet S.

The operation of Device 1 is therefore identical to the operation of the device described in FIGS. 1 and 2. Such a device also comprises a circulation loop for the fluid to be treated but also the circulating pump, which further reduces the need for tubing. Preferably, sealing cap 14, closure housing 13, the positioning plates 4, separating part 15 and collar 9 are fabricated of plastic, either injected or molded, preferably incorporating reinforcing fibers.

In the preceding example, the pump draws in fluid through the filtering elements of the second series $s_2$ and discharges it through the filtering elements of the first series $s_1$. Of course, through inversion of the direction of rotation of the turbine, it is possible to draw the fluid in through filtering elements 3 of the first series $s_1$ and discharge it through filtering elements 3 of the second series $S_2$.

Figure 5:
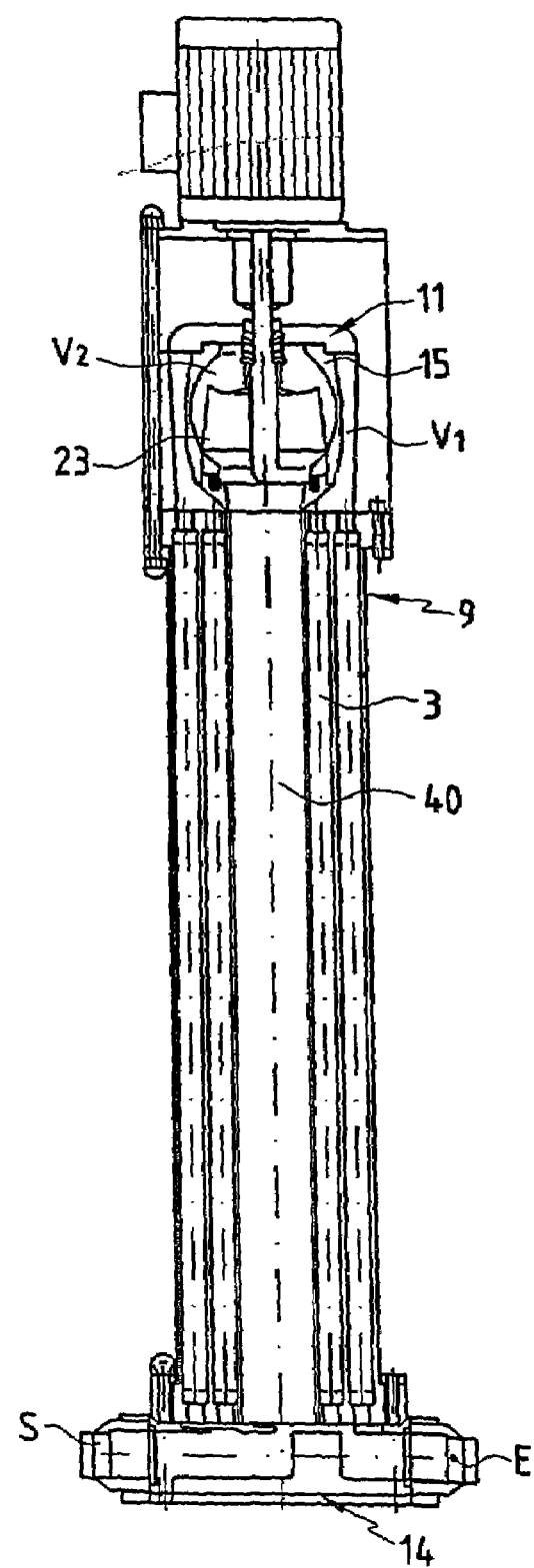
FIG. 5 is a section-elevation view of a second example of realization of a device in conformity with the invention.

FIG. 5 illustrates another example of realization of a device in compliance with the invention, in which one of the circuits of the fluid circulation loop consists of at least one pipe, 40. In the example shown, the second series $s_2$ of filtering elements 3 is eliminated and pipe 40 is mounted coaxially inside housing 2 and, more precisely, inside collar 9, being mounted between the positioning plates 4. In this example, filtering elements 3 of the last series $s_2$ are mounted outside of pipe 40.

The operation of the device in compliance with the invention remains identical to the preceding description. In the case of a suction pump, the fluid to be treated, which arrives via inlet E, is drawn into pipe 40 and exits into the second volume $V_2$ of the first chamber 11. The fluid then passes into first volume $V_1$, as explained previously, and then circulates through the filtering elements of first series $s_1$.

It is of course possible to reverse the direction of circulation of the fluid in the loop by reversing the direction of rotation of the turbine. In this case, sealed pipe 40 is placed at the periphery, thus delimiting, with the collar, a sealed ring. The filtering elements 3 are then located inside the sealed pipe. It is also possible to use several pipes 40. In this case, each filtering element 3 of the first series $s_1$ can be replaced by a sealed pipe whose external diameter is equal to that of filtering elements 3. In this type of configuration, the fluid to be treated is drawn through these n sealed pipes and is discharged into the filtering elements of the second series $s_2$. Thus pipe or pipes 40 is/are placed in the outgoing circuit of the circulation loop.

The invention claimed is:

1. Device for tangential filtering of a fluid to separated into a filtrate and a retentate, said device comprising within a housing (2):
    at least one inlet (E) for the fluid to be treated,
    at least one outlet (S) for evacuation of the retentate,
    a series of filtering elements (3) of tubular shape extending parallel to each other and sealingly penetrating a positioning plate (4) at each of their ends, the filtering elements (3) each comprising at least one circulation channel ($3_1$) for the fluid to be treated and providing filtering of said fluid, so as to obtain egress of the filtrate at the peripheral surface of the filtering elements, to be recovered in a collection volume (6) located between the positioning plates (4) and the housing (2),
    at least one outlet (7) for the filtrate communicating with the filtrate collection volume (6),
    a first communicating chamber (11) into which open one end of the filtering elements and which provides communication between the outgoing circuit and the return circuit of at least one circulation loop for the fluid to be treated, a separating part (15) mounted in the first communicating chamber (11), in sealed contact with the neighboring positioning plate (4), to divide said chamber into a first sub-chamber ($V_1$) and a second (V2) sub-chamber delimited externally and internally by the separating part and communicating with the outgoing and return circuits, the separating part dividing the filtering elements (3) into a first series ($s_1$) opposite the first sub-chamber placed in the outgoing circuit of the fluid to be treated and a second series ($s_2$) opposite the second sub-chamber placed in the return circuit of the fluid to be treated, a communication passage (24) between the first sub-chamber ($V_1$) and the second sub-chamber ($V_2$), a turbine (23) of a circulating pump disposed within one of the first and second sub-chambers, the turbine being fitted with a driving shaft (25) extending outside the first chamber (11) for connection to a driving motor (26), and a closure housing (13) sealed to a neighboring positioning plate (4), delimiting the first communicating chamber (11) and sealingly traversed by the driving shaft (25) of the turbine (23).

2. Arrangement as described in claim 1, wherein the separating part (15) is mounted in such a way that the first and second series ($s_1$, $s_2$) of filtering elements (3) have an approximately equal number of filtering elements (3).

3. Arrangement as described in claim 1, wherein the driving shaft (25) is mounted in the alignment of the axis of the collar (9) and that the driving motor (26) is supported by the closure housing (13).

4. Arrangement as described in claim 1, further comprising a second communicating chamber (12) delimited between a sealing cap (14) and the positioning plate which does not delimit the first communicating chamber (11), said second chamber (12) providing fluid feed to the outgoing circuit and recovery of the fluid to be treated after it has circulated in the return circuit.

5. Arrangement as described in claim 4, wherein the sealing cap (14) which delimits the second communicating chamber (12), is fitted:
    with inlet (E) for the fluid to be treated,
    with outlet (S) for evacuation of the retentate,
    and with an outlet (7) for the filtrate communicating with the filtrate collection volume (6) by means of orifices in the neighboring positioning plate (4) and in the sealing cap (14).

6. Arrangement as described in claim 1, wherein the positioning plates (4) are connected between themselves by means of a collar (9) delimiting the filtrate collection volume (6).

7. Arrangement as described in claim 5, wherein the sealing cap (14), the closure housing (13), the positioning plates (4), the separating part (15) and the collar (9) are fabricated of plastic.

8. Arrangement as described in claim 1, wherein the first and second sub-chambers are concentric, and the turbine is mounted in an inner sub-chamber.

* * * * *